(No Model.)  3 Sheets—Sheet 1.
D. M. WESTON, Dec'd.
A. RUSS, Executor & M. J. WESTON, Executrix.
CREAMING MACHINE.
No. 446,210. Patented Feb. 10, 1891.
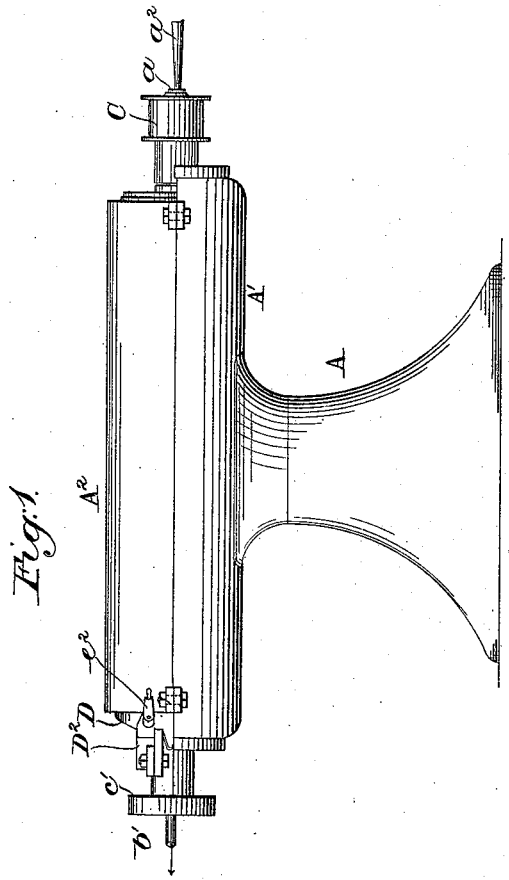
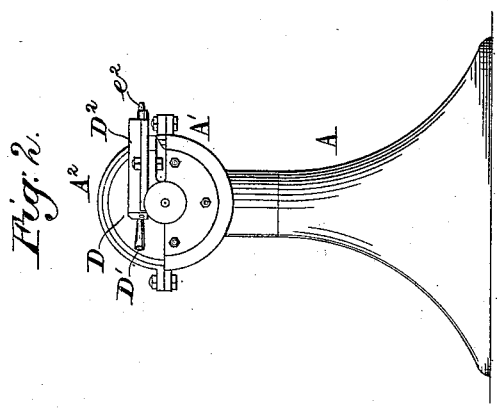

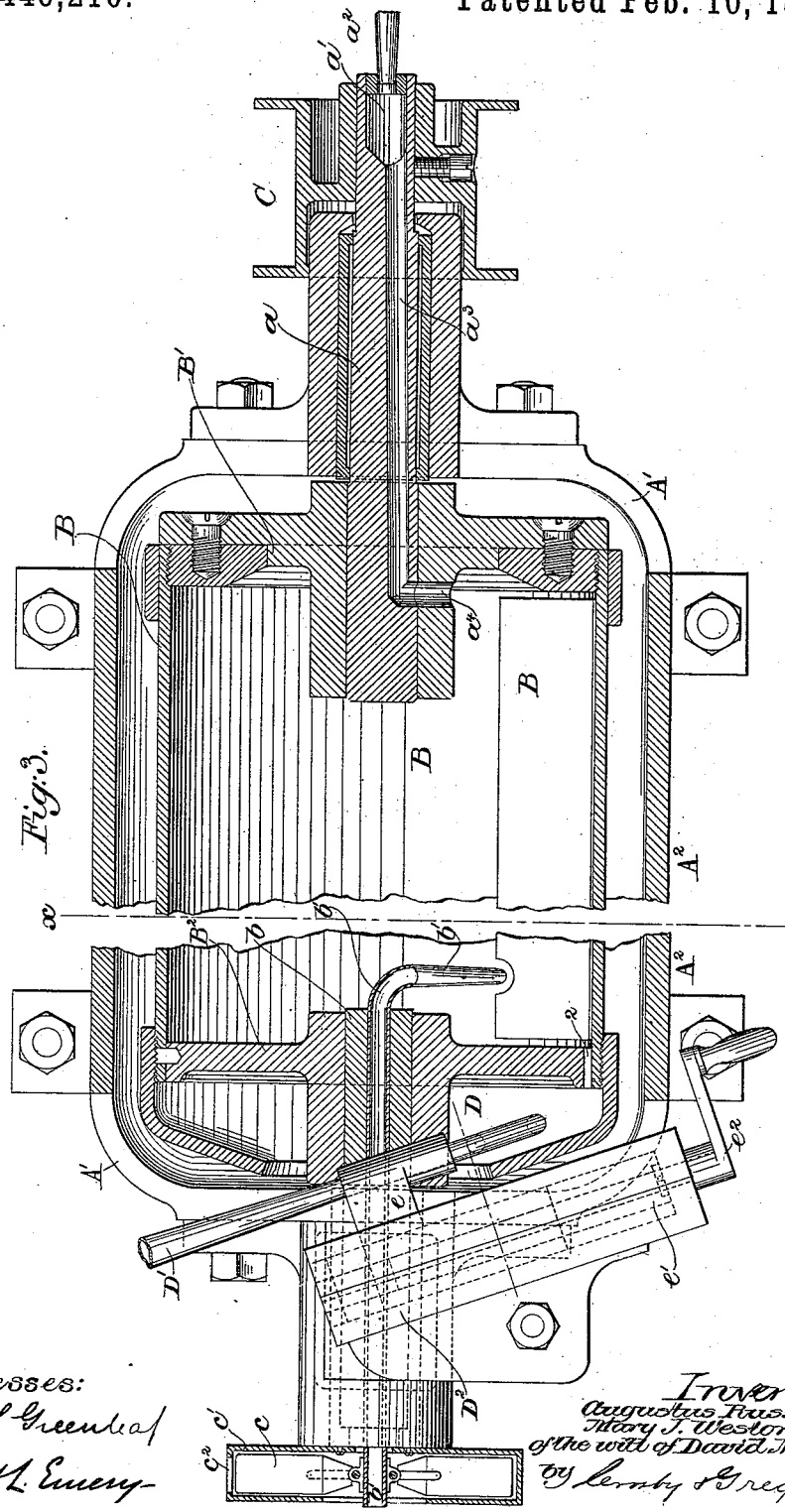

(No Model.) 3 Sheets—Sheet 3.
D. M. WESTON, Dec'd.
A. Russ, Executor & M. J. Weston, Executrix.
CREAMING MACHINE.
No. 446,210. Patented Feb. 10, 1891.
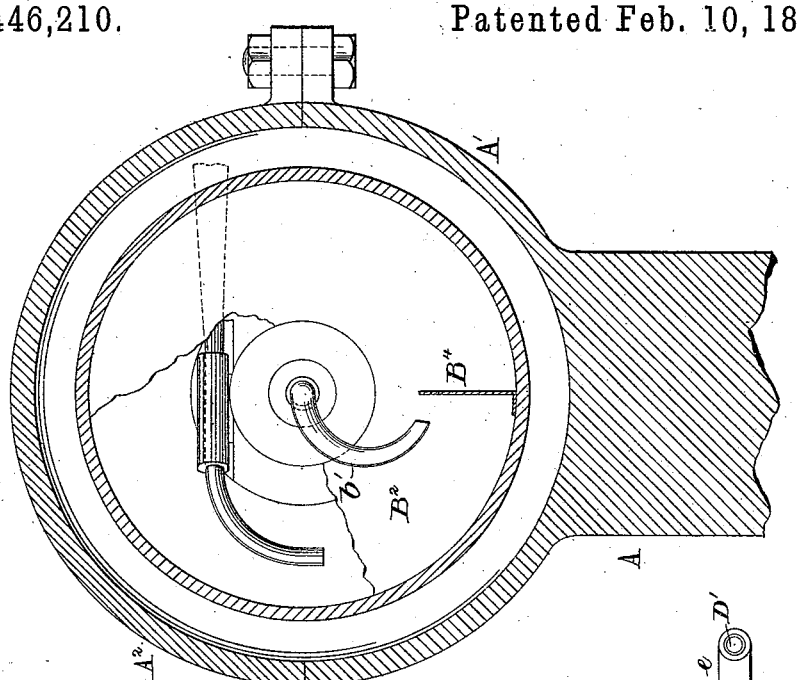
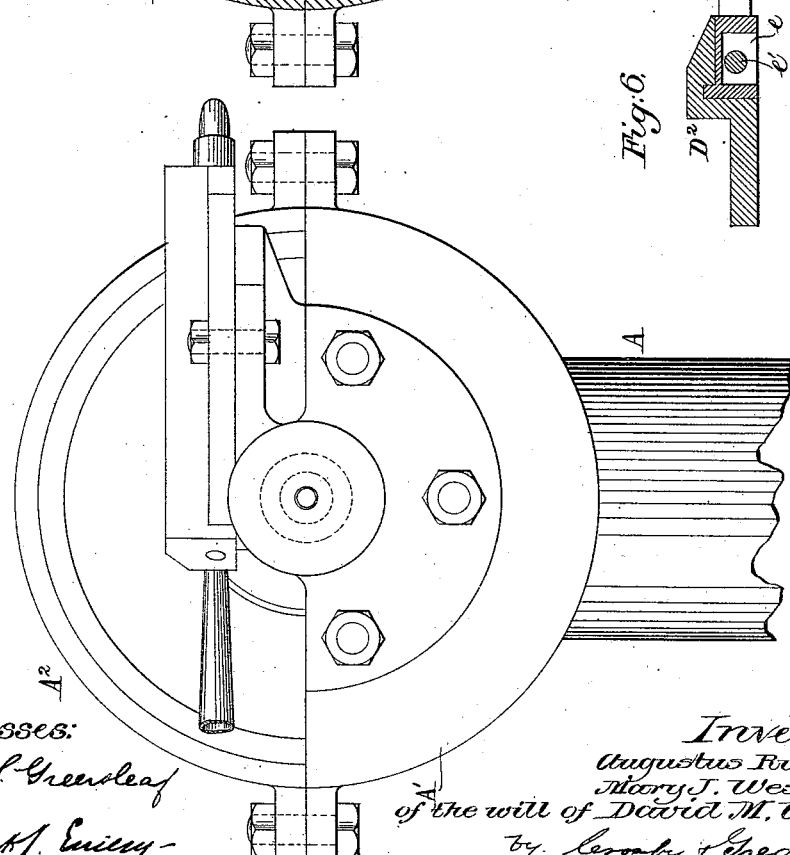
Witnesses:
Inventor:

UNITED STATES PATENT OFFICE.

AUGUSTUS RUSS AND MARY J. WESTON, OF BOSTON, MASSACHUSETTS, EXECUTOR AND EXECUTRIX OF DAVID M. WESTON, DECEASED.

CREAMING-MACHINE.

SPECIFICATION forming part of Letters Patent No. 446,210, dated February 10, 1891.

Application filed June 9, 1890. Serial No. 354,849. (No model.)

*To all whom it may concern:*

Be it known that we, AUGUSTUS RUSS and MARY J. WESTON, both of Boston, Massachusetts, are executor and executrix, respectively, of the estate of DAVID M. WESTON, deceased, late a citizen of the United States, and residing at Boston, in the county of Suffolk and State of Massachusetts, who did in his lifetime invent certain new and useful Improvements in Creaming-Machines, of which the following is a description.

This invention has for its object the production of an improved creaming machine or apparatus by which to separate cream from whole milk and remove the cream and skim-milk separately.

In creaming-machines as heretofore constructed great difficulty has been experienced in the action of the creaming apparatus in taking off the cream separated from the milk, the action of the device being so sudden as to in a measure break up and destroy the globules of cream, so that the cream is in a measure whipped into foam, which necessitates it being used speedily, or else the cream will spoil. This has been a very serious objection and has prevented the extended use of this class of machines.

In accordance with this invention a creaming-machine is provided with a skimmer for removing the cream, the said skimmer being adapted to rotate with the vessel containing the milk and cream to be separated, and this skimmer may be moved in unison with or made to fall behind the speed of rotation of the machine more or less, so as to remove the cream more or less slowly, as desired, the speed of removal of the cream depending upon the difference in speed between the rotation of the cream-cylinder and the cream-skimmer.

The means which are herein illustrated by which to put a "drag," as it may be called, upon the rotation of the skimming device, so that it moves more slowly than the cream-cylinder, is a fan-wheel; but this invention is not intended to be limited to making the drag in the shape of a fan.

In the machine to be herein described the whole milk from which the cream is to be separated is fed through a hollow journal of the cream-cylinder, the said journal having near its outer end a somewhat enlarged chamber, from which leads a milk-passage of smaller diameter and eccentrically placed with relation to the said chamber and center of rotation of the said journal, the inner end of the said milk-passage being turned out toward the periphery of the milk-cylinder, so as to discharge the whole milk into the said cylinder. This eccentric location of the milk-passage not only with relation to the chamber referred to, but to the center of rotation of the journal, constitutes what may be called one form of centrifugal pump, which carries the milk introduced into the said chamber forcibly into the milk-cylinder.

In all previous creaming-machines known to us the milk-cylinder has been adapted to rotate about a vertical axis, and the milk-cylinder has been made comparatively short, necessarily so, and the separation of the cream from the milk has been effected only by or through high speed of rotation of the milk-cylinder, it being not unfrequent to run them from five to six thousand revolutions a minute to enable them to separate the cream at a practical speed, so that they can afford to be used.

It has been discovered that by placing the cream-cylinder so as to rotate about a horizontal center the said cylinder may be made of any desired length and of comparatively small diameter, thus enabling the cream to have a longer distance to travel through when being separated from the milk.

The invention therefore consists in a creaming-machine containing a rotating cylinder and a skimming device rotating therewith, but at a slower speed.

Other features of the invention will be hereinafter described, and pointed out in the claims at the end of this specification.

Figure 1 in side elevation represents a creaming-machine embodying the invention. Fig. 2 is a left-hand end elevation thereof, the drag being omitted. Fig. 3 is an enlarged longitudinal partial horizontal section of the machine shown in Fig. 1. Fig. 4 is an enlarged left-hand end elevation of the part shown in Fig. 3, the drag device being omitted. Fig. 5 is a section of Fig. 3, supposed to be in about the line $x$, looking toward the left, the head $B^2$ being broken out; and Fig. 6 is a sectional detail showing part of the device for actuating the skim-milk-discharge tube.

The base A of the machine has mounted upon it a horizontal casing $A'$ $A^2$, suitably bolted together and having suitable bearings for the reception of the journals $a$ $b$ of the said milk cylinder B, the said cylinder consisting, essentially, of a cylindrical body suitably attached to heads $B'$ $B^2$, which are secured in any suitable manner to the said journals $a$ $b$, the bearings for the said journals having any usual linings or contrivances to prevent wear and enable the journals to be run with little friction and noise.

The journal $a'$ has fast upon one end of it a driving-pulley C, about which will be placed any usual driving-belt. The journal $a$ has at its outer end a chamber $a'$, (shown best in Fig. 3,) into which is extended the end of a tube $a^2$, leading from any usual supply for whole milk, the said tube introducing the whole milk into the said chamber. The journal $a$ is bored through from one side of the chamber $a'$, so as to provide a whole-milk passage $a^3$ in the said journal, which is not only eccentric to the chamber, but also to the center of rotation of the journal $a$, so that the whole milk fed into the chamber will in the rotation of the journal be thrown with force into the interior of the milk-cylinder B through the opening $a^4$ in the hub $B'$.

The chamber and milk-passage constitute a sort of centrifugal pump, the speed at which the whole milk is thrown into the cylinder depending upon the speed of rotation of the said cylinder.

The journal $b$ is bored centrally and has fitted into it loosely the cream-skimmer, (shown as a tube $b'$,) having its inner end bent down into the milk-cylinder toward its periphery, the said end extending substantially to the point where the cream-wall will be formed.

The cream-cylinder is provided at its inner wall with one or more thin partitions $B^4$, extended from one to its other end, the said partition standing in the milk and carrying it around with the cylinder in usual manner, and as herein shown the edge of the partition is notched to let the mouth of the skimmer pass a little below the main part of the edge of the wall.

The outer end of the skimming device (see Fig. 3) is provided with a drag, herein represented as a fan-wheel $c$, the hub of which is connected directly to the said cream-skimmer, the blades of the fan-wheel acting within a casing $c'$, connected to the frame-work and having at some suitable place a cover or slide, as $c^2$, by which to regulate the amount of air which may pass through the said casing, thus regulating the amount of drag, for in practice the smaller the opening in the casing the less the drag, and the greater the drag upon the skimming device the slower its speed of rotation with relation to the speed of rotation of the milk-cylinder. By regulating this drag the open end of the cream-skimmer, or that which enters the cream-wall and removes the cream from the skim-milk, may be made to travel sufficiently slow so that the cream-wall being carried around by the milk-cylinder may be fed or pushed into the open mouth of the skimmer at any desired speed, the speed being sufficient, however, to overcome the centrifugal force of the revolving skimmer $b'$, care being also taken to so regulate this speed that the cream-globules will not be broken and destroyed, thus causing the cream to be "whipped," as it is called, after which it rapidly sours.

By this improved machine it is possible to take off the cream in such a way that the cream-globules are not broken.

The head $B^2$ of the milk-cylinder is provided with a suitable number of passages, as 2, as shown at the left of Fig. 3, through which the skim-milk is forced in the skim-milk curb D, the said curb rotating in unison with the milk-cylinder. This curb is open at its center, and has extended into it a skim-milk tube $D'$, the said tube being carried by a bracket $e$, the shank of which is provided with a suitable screw-thread and placed in a suitable guide $D^2$, bolted to the frame-work, is acted upon by a screw, as $e'$, (shown by dotted lines in Fig. 3,) the said screw having a suitable handle $e^2$, by which to rotate it to thus move the carrier and its connected skim-milk tube, so that the open inner mouth of the tube may be placed more or less in the skim-milk chamber to remove the milk therefrom and discharge the same into a suitable receptacle.

In practice, when the machine is rotated regularly, the inner end of the skim-milk tube is projected just a little way into the skim-milk chamber, so as to take the skim-milk out gradually; but just before the machine is to be stopped the screw is operated to place the inner end of the skim-milk tube farther into the skim-milk chamber substantially in line with the walls of the milk-cylinder, so as to remove all the milk therefrom or any other fluid matter therein.

In practice the milk-cylinder arranged to rotate about a horizontal axis may be made of considerable length—say from two to six times the diameter of the cylinder, more or less—such increase of length affording an increased travel for the milk in the cylinder while the cream is being separated from the milk, which greatly increases the efficiency of it and enables the machine to be run at a slower speed and yet do better work, the action of the machine upon the whole milk and cream being less violent.

We claim as the invention of DAVID M. WESTON, deceased—

1. An organized creaming-machine containing a rotating cylinder and a cream-skimming device rotated therewith, but at a slower speed, substantially as described.

2. A horizontally-supported rotating cylinder to contain milk, combined with a cream-skimmer traveling therewith, but at a slower speed, and with a drag to control the difference in speed between the cylinder and skimmer, substantially as described.

3. The rotating cylinder having hollow journals, a skimmer rotating at a slower speed than the said cylinder and mounted loosely with relation to one of the said journals to take the cream out through the said journal, combined with the skim-milk skimmer and means to adjust it toward and from the periphery of the skim-milk chamber, substantially as described.

AUGUSTUS RUSS,
MARY J. WESTON,
*Executor and executrix of David M. Weston, deceased.*

Witnesses:
DUDLEY A. DORR,
G. H. WESTON.